(12) United States Patent
Wright et al.

(10) Patent No.: US 12,541,244 B2
(45) Date of Patent: Feb. 3, 2026

(54) OBTAINING LOCATION METADATA FOR NETWORK DEVICES USING AUGMENTED REALITY

(71) Applicant: Charter Communications Operating, LLC, St. Louis, MO (US)

(72) Inventors: Ethan Wright, Denver, CO (US);
Matthew J. Wright, Denver, CO (US);
Micah Labbee, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/176,541

(22) Filed: Mar. 1, 2023

(65) Prior Publication Data

US 2023/0208726 A1 Jun. 29, 2023

Related U.S. Application Data

(63) Continuation of application No. 16/939,709, filed on Jul. 27, 2020, now Pat. No. 11,616,699.

(51) Int. Cl.
*G06F 3/01* (2006.01)
*G06N 20/00* (2019.01)
(Continued)

(52) U.S. Cl.
CPC ............ *G06F 3/011* (2013.01); *G06N 20/00* (2019.01); *G06T 19/006* (2013.01); *G06V 20/20* (2022.01);
(Continued)

(58) Field of Classification Search
None
See application file for complete search history.

(56) References Cited

U.S. PATENT DOCUMENTS 10,803,665 B1 * 10/2020 Patel ................... A63F 13/5255
2008/0039114 A1 2/2008 Phatak et al.
(Continued)

OTHER PUBLICATIONS

Non-Final Office Action for U.S. Appl. No. 16/939,709, mailed Jun. 18, 2021, 13 pages.
(Continued)

*Primary Examiner* — Oleg Survillo
*Assistant Examiner* — Christopher P Cadorna
(74) *Attorney, Agent, or Firm* — Dority & Manning, P.A.

(57) ABSTRACT

Obtaining location metadata for network devices using augmented reality (AR) is disclosed herein. In one embodiment, an AR computing device receives first user inputs indicating boundary points of a device region, and determines first spatial coordinates for each boundary point. The AR computing device next receives a second user input that indicates a network device within the device region, and determines second spatial coordinates for the network device. The AR computing device may also correlate the network device with a known connected network device. The AR computing device then transmits, to a server computing device, first metadata that includes the first spatial coordinates and an identifier of the device region, and second metadata that includes the second spatial coordinates and an identifier of the indicated network device. In some embodiments, the metadata may be employed, e.g., to generate a floorplan visualization and/or a signal strength map of the device region.

20 Claims, 17 Drawing Sheets

(51) Int. Cl.
  *G06T 19/00* (2011.01)
  *G06V 20/20* (2022.01)
  *H04L 41/08* (2022.01)
  *H04L 41/0806* (2022.01)
  *H04L 41/12* (2022.01)
  *H04L 41/16* (2022.01)
  *H04W 64/00* (2009.01)

(52) U.S. Cl.
  CPC ...... *H04L 41/0806* (2013.01); *H04L 41/0883* (2013.01); *H04L 41/16* (2013.01); *H04W 64/003* (2013.01); *H04L 41/12* (2013.01)

(56) References Cited

U.S. PATENT DOCUMENTS

| | | | |
|---|---|---|---|
| 2013/0081083 A1 | 3/2013 | Yu et al. | |
| 2013/0176204 A1 | 7/2013 | Higuchi et al. | |
| 2015/0346968 A1 | 12/2015 | Johnson et al. | |
| 2018/0213359 A1 | 7/2018 | Reinhardt et al. | |
| 2020/0314623 A1 | 10/2020 | Pellegrini et al. | |
| 2020/0329340 A1* | 10/2020 | Rahman | H04B 17/382 |
| 2020/0404513 A1 | 12/2020 | Hayes et al. | |
| 2021/0006932 A1 | 1/2021 | Bai et al. | |
| 2021/0036927 A1* | 2/2021 | Mantri | H04L 41/12 |
| 2021/0178252 A1* | 6/2021 | LaHorgue | A63F 13/216 |
| 2021/0252384 A1* | 8/2021 | Li | A63F 13/35 |
| 2021/0387098 A1* | 12/2021 | Jeffery, III | A63F 13/327 |

OTHER PUBLICATIONS

Final Office Action for U.S. Appl. No. 16/939,709, mailed Dec. 7, 2021, 15 pages.
Advisory Action for U.S. Appl. No. 16/939,709, mailed Feb. 24, 2022, 3 pages.
Non-Final Office Action for U.S. Appl. No. 16/939,709, mailed Apr. 1, 2022, 14 pages.
Final Office Action for U.S. Appl. No. 16/939,709, mailed Sep. 6, 2022, 15 pages.
Notice of Allowance and Notice of Allowability for U.S. Appl. No. 16/939,709, mailed Sep. 6, 2022, 3 pages.
Oliver, Sam, "Google brings popular augented reality game to the Apple's IOS," AppleInsider.com, Jul. 14, 2014, 7 pages.
Spinfold, "History of the First Touch Screen Phone," May 2016, 5 pages.
Wikipedia, "Ingress," 2013, 15 pages.

* cited by examiner

OBTAINING LOCATION METADATA FOR NETWORK DEVICES USING AUGMENTED REALITY

RELATED APPLICATION

This application is a continuation of co-pending U.S. patent application Ser. No. 16/939,709, filed on Jul. 27, 2020, entitled "OBTAINING LOCATION METADATA FOR NETWORK DEVICES USING AUGMENTED REALITY," which is hereby incorporated herein by reference in its entirety.

BACKGROUND

As modern homes and workplaces continue to become more sophisticated, the number of network devices, such as Internet of Things (IoT) devices, Wi-Fi-enabled devices, and the like, that are in use continues to rise. Consequently, knowledge of the physical locations of the network devices (particularly in relation to each other, to network access points, and/or to physical obstructions such as walls), is increasingly important for optimizing network connectivity and providing location-based services using the network devices. More efficient mechanisms for accurately identifying the locations of network devices within a physical space are thus desirable.

SUMMARY

The embodiments disclosed herein obtain location metadata for network devices using augmented reality (AR) computing devices, and employ the location metadata to provide services such as floorplan visualizations, signal strength maps, and location recommendations for network devices within a physical space.

In one embodiment, a method for obtaining location metadata for network devices using AR computing devices is provided. The method includes receiving, by an AR computing device, a plurality of first user inputs indicating a respective plurality of boundary points defining a device region. The method further includes determining, based on the plurality of first user inputs, a plurality of first spatial coordinates for the respective plurality of boundary points defining the device region. The method also includes receiving, by the AR computing device, a second user input indicating a network device within the device region. The method additionally includes determining, based on the second user input, second spatial coordinates for the network device within the device region. The method further includes transmitting, to a server computing device, first metadata comprising the plurality of first spatial coordinates and an identifier of the device region and second metadata comprising the second spatial coordinates and an identifier of the network device within the device region.

In another embodiment, an AR computing device is provided. The AR computing device includes a system memory, and a processor device communicatively coupled to the system memory. The processor device is configured to receive a plurality of first user inputs indicating a respective plurality of boundary points defining a device region. The processor device is further configured to determine, based on the plurality of first user inputs, a plurality of first spatial coordinates for the respective plurality of boundary points defining the device region. The processor device is also configured to receive a second user input indicating a network device within the device region. The processor device is additionally configured to determine, based on the second user input, second spatial coordinates for the network device within the device region. The processor device is further configured to transmit, to a server computing device, first metadata comprising the plurality of first spatial coordinates and an identifier of the device region and second metadata comprising the second spatial coordinates and an identifier of the network device within the device region.

In another embodiment, a non-transitory computer-readable medium is provided. The non-transitory computer-readable medium stores computer-executable instructions that, when executed, cause a processor device of an AR computing device to receive a plurality of first user inputs indicating a respective plurality of boundary points defining a device region. The computer-executable instructions further cause the processor device to determine, based on the plurality of first user inputs, a plurality of first spatial coordinates for the respective plurality of boundary points defining the device region. The computer-executable instructions also cause the processor device to receive a second user input indicating a network device within the device region. The computer-executable instructions additionally cause the processor device to determine, based on the second user input, second spatial coordinates for the network device within the device region. The computer-executable instructions further cause the processor device to transmit, to a server computing device, first metadata comprising the plurality of first spatial coordinates and an identifier of the device region and second metadata comprising the second spatial coordinates and an identifier of the network device within the device region.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
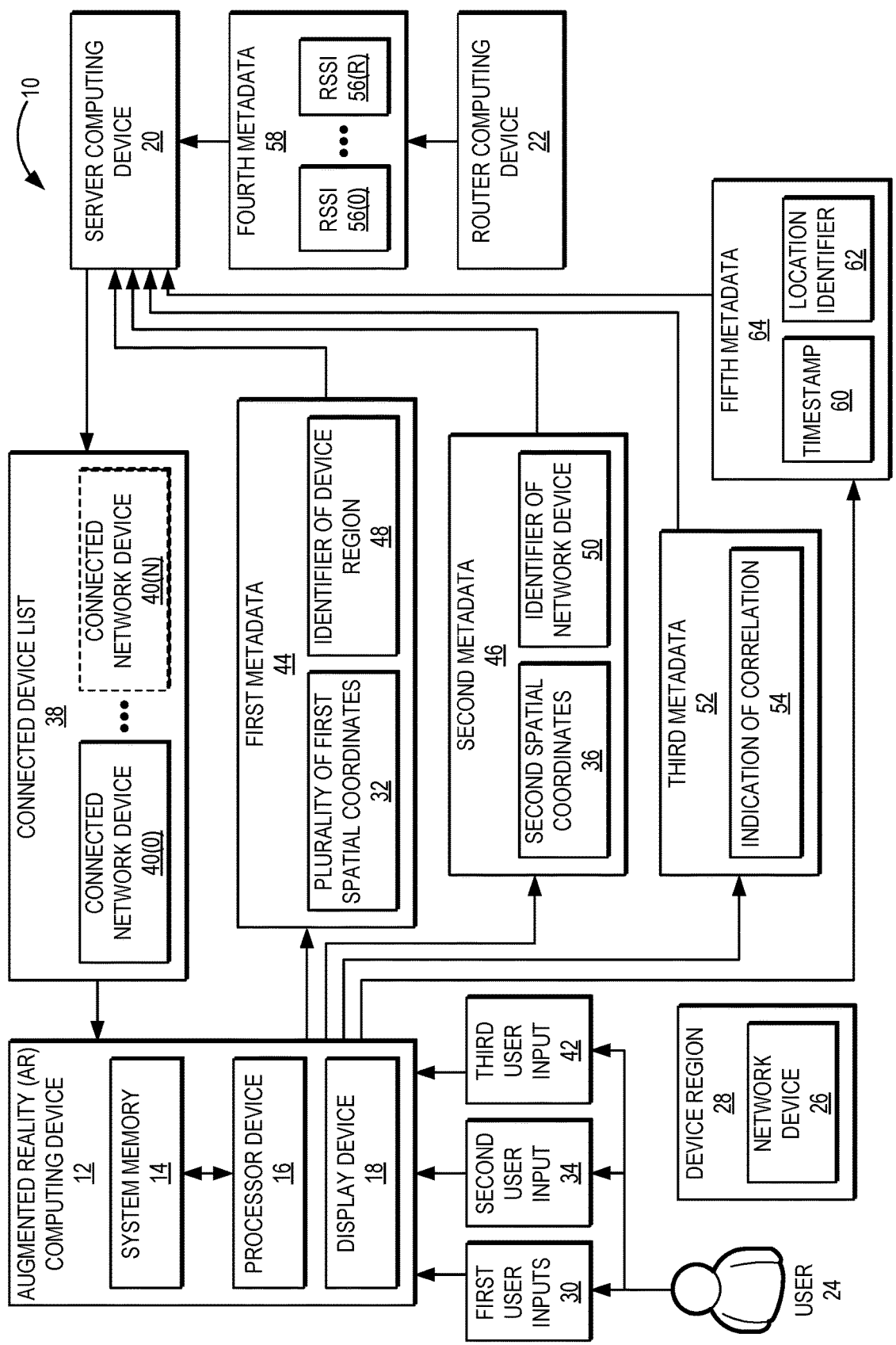
FIG. 1 is a block diagram illustrating an exemplary communications network, including a server computing device, a router computing device, and an augmented reality (AR) computing device, configured to obtain location metadata for network devices using AR.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As modern homes and workplaces become more sophisticated, the number of network devices (e.g., computing devices interconnected via a personal or private communications network, such as Internet of Things (IoT) devices, Wi-Fi-enabled devices, and the like) continues to increase. As network devices proliferate, optimization of network connectivity for the network devices and provision of location-based services using the network devices depend on obtaining accurate information regarding the physical locations of the network devices (particularly in relation to each other, to network access points, and to physical obstructions such as walls within their operating environments). Thus, mechanisms for obtaining location metadata for network devices with greater efficiency and accuracy are desirable.

In this regard, embodiments disclosed herein obtain location metadata for network devices using augmented reality (AR). As used herein, "augmented reality" refers to technologies for overlaying computer-generated digital information or virtual objects onto a representation of a non-virtual real-world environment. Computing devices that provide AR functionality ("AR computing devices") can be used to provide an immersive experience in which a user perceives virtual elements as being integrated into the real-world environment (in contrast with "virtual reality," in which the entire virtual environment perceived by the user is computer-generated). AR computing devices may include any computing device that provides a processor device, a display device (such as a screen, a head-mounted display (HMD), eyeglasses, and/or the like, as non-limiting examples), an input device, and appropriate sensors for detecting position and movement of the computing device (e.g., accelerometers, compasses, positioning systems, and/or the like, as non-limiting examples).

According to embodiments disclosed herein, a user may use an AR computing device to first define a device region (i.e., a physical area within which network devices are located) by providing first user inputs to the AR computing device indicating boundary points of the device region. In some embodiments, each boundary point may correspond to a corner where two walls, two walls and a ceiling, or two walls and a floor of the device region intersect. According to some embodiments, the user may provide the first user inputs by using the AR computing device to view, on a display device of the AR computing device, a scene including the boundary point, and then selecting the boundary point within the scene. Based on the first user inputs, the AR computing device determines spatial coordinates for each boundary point (i.e., "first spatial coordinates") using conventional AR techniques. The first spatial coordinates each may comprise a three-dimensional location identifier of the corresponding boundary point, and may specify the location of the boundary point in absolute terms (such as, e.g., a Global Positioning System (GPS) coordinate, as a non-limiting example) or relative to a known position (such as a position of a router computing device, as a non-limiting example).

Next, the user provides a second user input that indicates a network device within the device region (e.g., by using the AR computing device to view a scene including the network device on the display device of the AR computing device, and selecting the network device within the scene, as a non-limiting example). Using the second user input, the AR computing device determines spatial coordinates for the network device (i.e., "second spatial coordinates"). The second spatial coordinates may comprise a three-dimensional location identifier of the network device in absolute terms or relative to another known location, such as the location of the router computing device. This process may be repeated for multiple network devices within the device region.

According to some examples, the AR computing device may also obtain a list of connected network devices (e.g., network devices that are connected to the router computing device) from a server computing device, and may correlate the network device indicated by the second user input with a connected network device on the list of connected network devices. The process for correlating the network device with the connected network device may be based on a third user input provided by the user (e.g., by selecting the appropriate connected network device from a list displayed by the AR computing device, as a non-limiting example), or based on a machine learning (ML) model that identifies the network device as corresponding to the connected network device without additional user input.

The AR computing device then transmits, to the server computing device, first metadata that includes the first spatial coordinates and an identifier of the device region, and second metadata that includes the second spatial coordinates and an identifier of the network device. In embodiments in which the AR computing device correlates the network device with a connected network device on the list of connected network devices, the AR computing device may also transmit third metadata that includes an indication of the correlation of the network device with the connected network device.

As discussed in greater detail below, some embodiments disclosed herein may use the metadata generated by the AR computing device to generate and display a floorplan visualization of the device region to illustrate relative locations of the router computing device, the boundary points defining the device region, and the network device within the device region. Some embodiments may also provide that the router computing device may determine received signal strength indications (RSSIs) based on its communications with the AR computing device, and may provide fourth metadata including the RSSIs to the server computing device. The fourth metadata may be used in conjunction with the first metadata, the second metadata, and the third metadata to generate and display a signal strength map that comprises a visual representation of the RSSIs within the device region. The signal strength map may also incorporate timestamp and location data that is recorded by the AR computing device and provided to the server computing device as fifth metadata. The signal strength map may be used to generate and display a location recommendation for the network device within the device region (e.g., to improve network connectivity and/or to reduce interference).

FIG. 1 is a block diagram illustrating an exemplary communications network 10 that may be utilized to obtain location metadata for network devices using AR. The communications network 10 in the example of FIG. 1 includes an AR computing device 12 comprising a system memory 14, a processor device 16 communicatively coupled to the system memory 14, and a display device 18. The communications network 10 also includes a server computing device 20, which in some embodiments may comprise a multiple-system operator (MSO) server computer. The communications network 10 further includes a router computing device 22, which in some embodiments may comprise an MSO managed wireless router or an MSO managed wired router, as non-limiting examples. In the example of FIG. 1, the router computing device 22 provides router functionality to the AR computing device 12, and thus it is to be understood that network traffic to and from the AR computing device 12 (e.g., to and from the server computing device 20) passes through the router computing device 22. It is to be further understood that the elements of the communications network 10, including the AR computing device 12 and the server computing device 20, are interconnected via a publicly accessible network (e.g., the internet) and/or a private network.

In exemplary operation, a user 24 seeks to use the AR computing device 12 to obtain location metadata for a network device 26 within a device region 28. The device region 28 of FIG. 1 represents a physical area, such as a room or an office, within which the network device 26 is located. Although not shown in FIG. 1, it is to be understood that multiple network devices 26 and/or other devices, such as the router computing device 22, may also be located within the device region 28.

The AR computing device 12 first receives a plurality of first user inputs from the user 24 to indicate a respective plurality of boundary points (not shown) defining the device region 28. The plurality of boundary points may comprise, for instance, the corners of the device region 28, and the user may provide the first user inputs 30 by viewing a scene of the device region 28 via the display device 18 of the AR computing device 12 and selecting the boundary points within the viewed scene. Selection of the boundary points in some embodiments is discussed in greater detail below with respect to FIG. 2A. Based on the first user inputs 30, the AR computing device 12 determines a corresponding plurality of first spatial coordinates 32 for the respective boundary points using conventional AR techniques. Each of the first spatial coordinates 32 may comprise a three-dimensional location identifier of the respective boundary point, and may specify the location of the boundary point in absolute terms (such as, e.g., a Global Positioning System (GPS) coordinate, as a non-limiting example) or relative to a known position (such as a position of the router computing device 22, as a non-limiting example).

The AR computing device 12 next receives a second user input 34 from the user 24 to indicate the network device 26 within the device region 28. In some embodiments, the user may provide the second user input 34 by viewing a scene of the device region 28 via the display device 18 of the AR computing device 12, and selecting the network device 26 within the viewed scene. Selection of the network device 26 in some embodiments is discussed in greater detail below with respect to FIG. 2B. The AR computing device 12 then determines second spatial coordinates 36 for the network device 26 using conventional AR techniques. As with the plurality of first spatial coordinates 32, the second spatial coordinates 36 may comprise a three-dimensional location identifier of the network device 26 that specifies a location of the network device 26 in either absolute or relative terms.

In some embodiments, the AR computing device 12 is configured to correlate the network device 26 with one of multiple known connected network devices. For instance, the server computing device 20 may maintain a connected device list 38 that identifies one or more connected network devices (0)-40(N) that are connected to the router computing device 22. In such embodiments, the AR computing device 12 may obtain the connected device list 38 from the server computing device 20. After receiving the second user input 34 indicating the network device 26 within the device region 28, the AR computing device 12 may correlate the network device 26 with one of the connected network devices 40(0)-40(N) of the connected device list 38. Correlating the network device 26 with one of the connected network devices (0)-40(N) may be performed automatically using an ML model, or may be based on a third user input 42 that identifies the network device 26 as corresponding to one of the connected network devices 40(0)-40(N). Identification of the network device 26 as corresponding to one of the connected network devices 40(0)-40(N) by the user 24 in some embodiments is discussed in greater detail below with respect to FIG. 2C.

The AR computing device 12 then transmits first metadata 44 and second metadata 46 to the server computing device 20. The first metadata 44 includes the plurality of first spatial coordinates 32, along with an identifier 48 of the device region 28. The identifier 48 of the device region 28 may be automatically generated by the AR computing device 12, or may comprise a user-friendly designation assigned by the user 24. The second metadata 46 includes the second spatial coordinates 36 and an identifier 50 of the network device 26. The identifier 50 of the network device 26 in some embodiments may comprise, as non-limiting examples, a machine name of the network device 26, a media access control (MAC) address of the network device 26, and/or the like. Some embodiments may provide that the identifier 50 of the network device 26 may comprise a user-friendly designation provided by the user 24 or by the network device 26. In embodiments in which the AR computing device 12 correlates the network device 26 with one of the connected network devices (0)-40(N), the AR computing device 12 may also transmit third metadata 52, comprising an indication 54 of the correlation, to the server computing device 20.

As discussed in greater detail below with respect to FIG. 3A, the first metadata 44, the second metadata 46, and the third metadata 52 may be used, for example, to generate a floorplan visualization of the device region 28 to better allow the user 24 to visualize the relative locations of network devices, such as the network device 26, within the device region 28. In some embodiments, the router computing device 22 may also collect metadata that can be used in conjunction with the first metadata 44, the second metadata 46, and the third metadata 52 to generate a signal strength map for the device region 28, as discussed in greater detail below with respect to FIG. 3B. In such embodiments, as the user 24 moves with the AR computing device 12 within the device region 28, the router computing device 22 collects a plurality of RSSIs 56(0)-56(R). Each of the RSSIs 56(0)-56(R) indicates a received signal strength for communications from the AR computing device 12 received by the router computing device 22 at a particular location and time. Some embodiments may provide that the router computing device 22 measures each RSSI 56(0)-56(R) responsive to expiration of a periodic time interval (e.g., once per second, as a non-limiting example). The router computing device 22 then transmits fourth metadata 58, comprising the RSSIs 56(0)-56(R), to the server computing device 20.

The fourth metadata 58 may be supplemented by additional metadata recorded by the AR computing device 12 as it is moved within the device region 28. According to some embodiments, the AR computing device 12 records a timestamp 60 and a location identifier 62 for the AR computing device 12 responsive to detecting movement of the AR computing device 12. For instance, the AR computing device 12 may be configured to record the timestamp 60 and the location identifier 62 in response to detecting that the AR computing device 12 has moved more than six (6) inches in any direction. The AR computing device 12 subsequently sends fifth metadata 64 comprising the timestamp 60 and the location identifier 62 to the server computing device 20. It is to be understood that, although not illustrated in FIG. 1, the AR computing device 12 may record multiple timestamps 60 and respective multiple location identifiers 62, and the fifth metadata 64 may comprise the multiple timestamps 60 and the multiple location identifiers 62.

Some embodiments may leverage the location metadata (i.e., (i.e., the first metadata 44, the second metadata 46, the third metadata 52, the fourth metadata 58, and/or the fifth metadata 64) to provide other services using location-based rules. As a non-limiting example, the AR computing device 12 may provide a user interface (not shown) through which the user 24 can specify actions that are to be performed by previously identified network devices within the device region 28 if the previously identified network devices satisfy certain location criteria. For instance, the user 24 may define a subgroup of identified network devices (e.g., network-enabled lighting devices) within the device region 28 that are within a specified distance of another network device (e.g., a network-enabled television). The user 24 can then specify actions to be performed by or instructions to be issued to the subgroup of network devices (e.g., lower the lighting level for the network-enabled lighting devices within 10 feet of the network-enabled television).

Figure 2A:
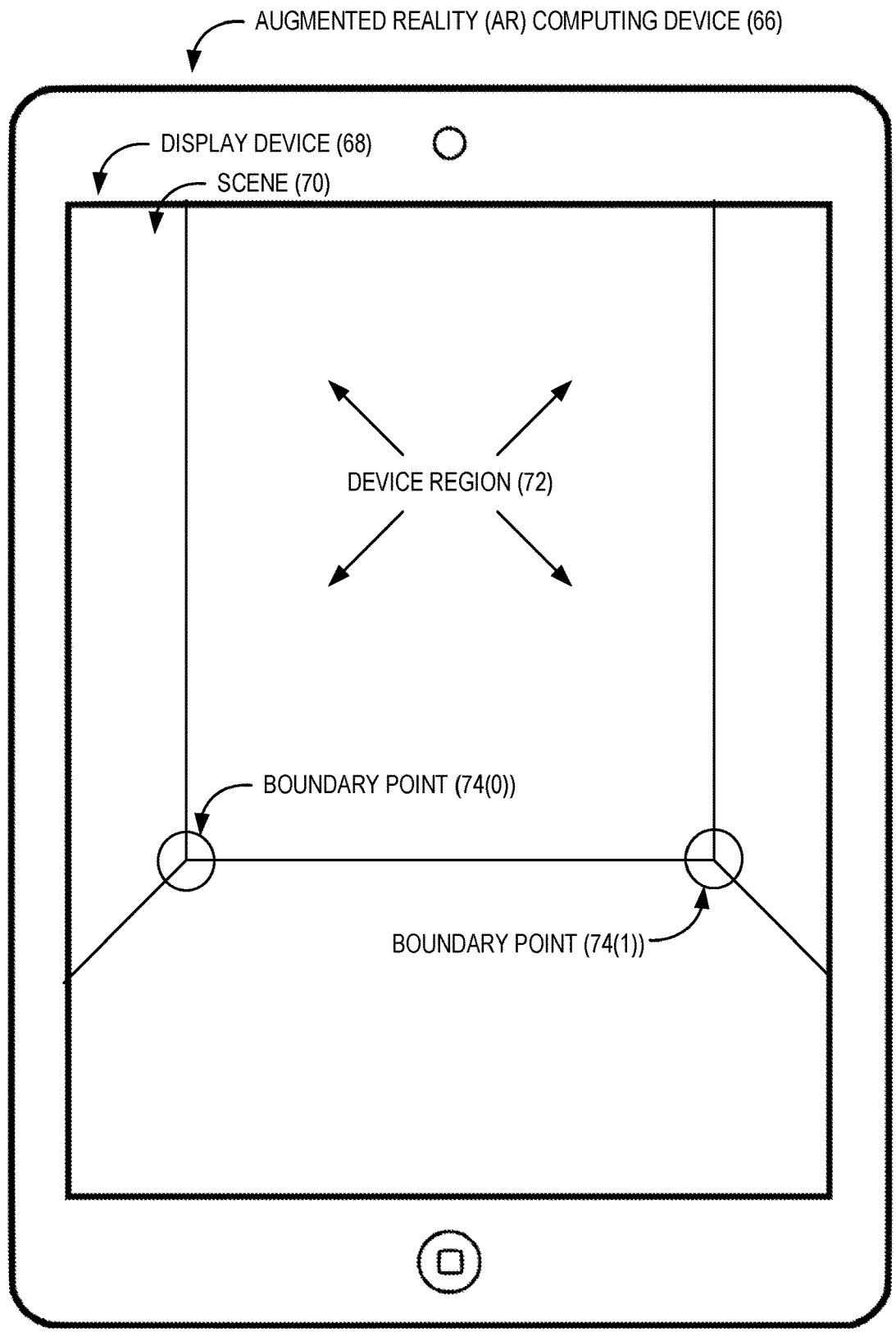
FIGS. 2A-2C illustrate exemplary user interfaces provided by the AR computing device of FIG. 1 for receiving user inputs defining boundary points of a device region and indicating a location and identity of a network device using AR, in accordance with some embodiments.
Figure 2B:
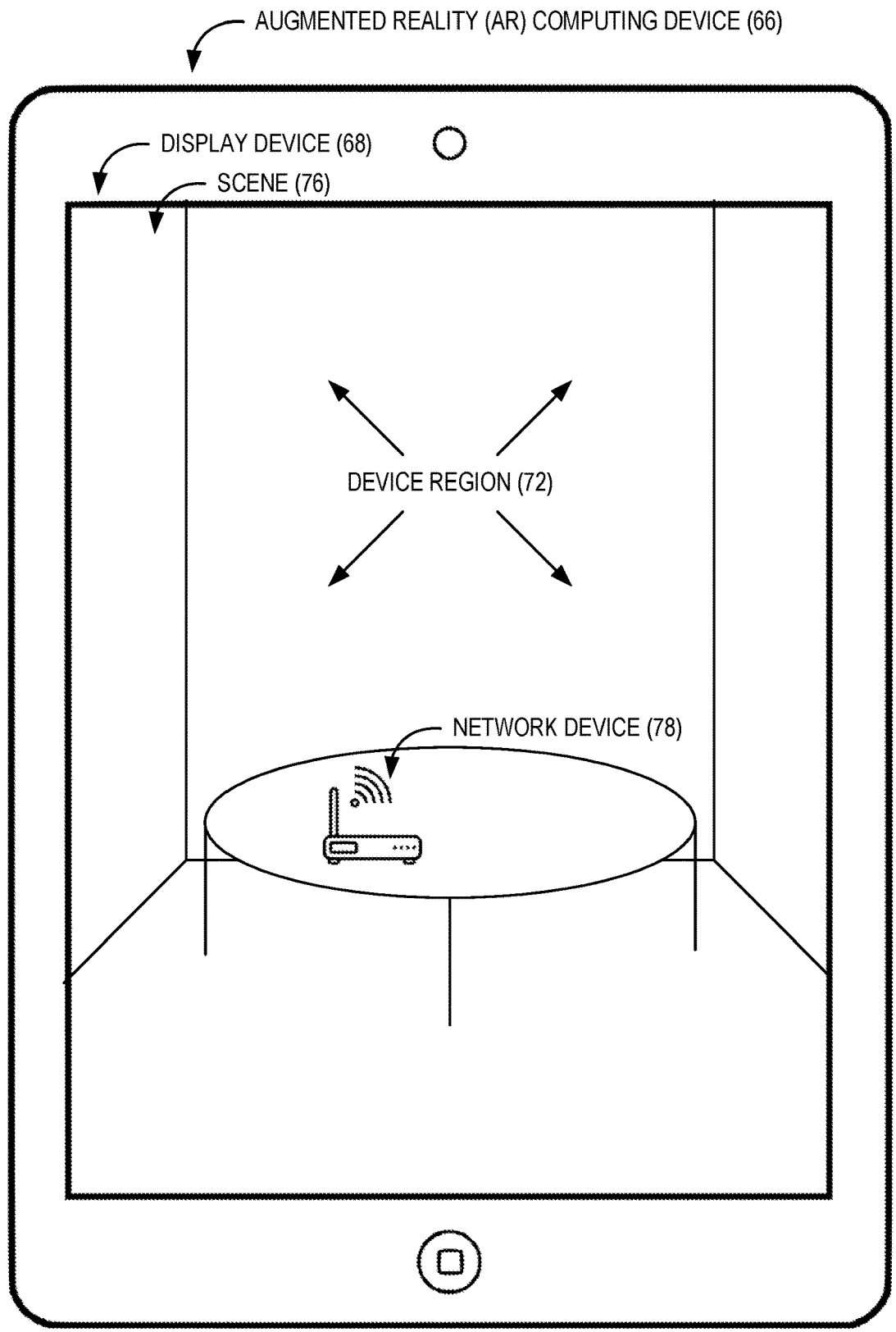
Figure 2C:
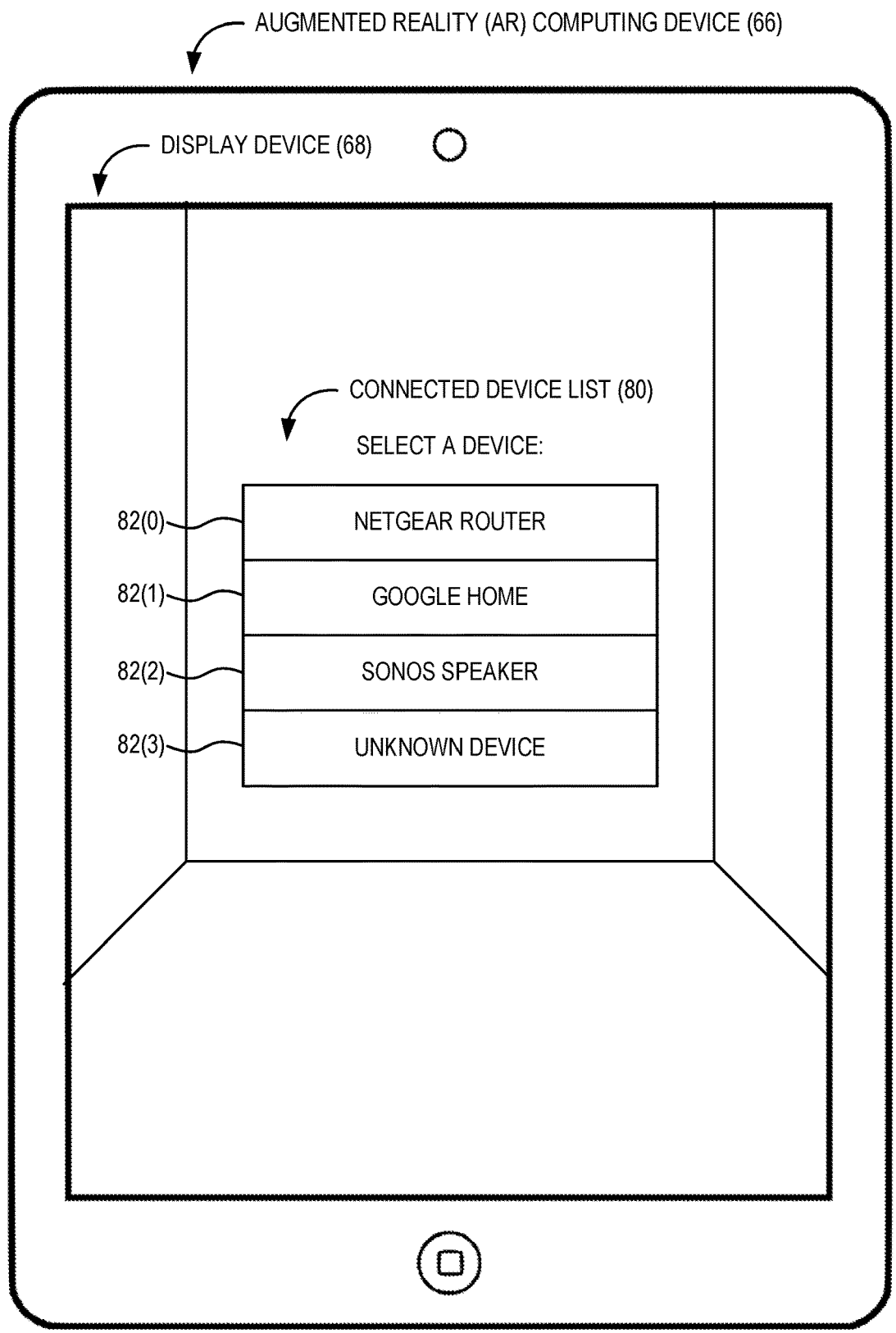

To illustrate exemplary user interfaces provided by the AR computing device 12 of FIG. 1 for receiving the first user inputs 30, the second user input 34, and the third user input 42 in accordance with some embodiments, FIGS. 2A-2C are provided. In FIG. 2A, an AR computing device 66, corresponding in functionality to the AR computing device 12 of FIG. 1, is shown. The AR computing device 66 includes a display device 68, via which a user (not shown) can view a scene 70 showing a portion of a device region 72. As seen in FIG. 2A, two boundary points 74(0) and 74(1) of the device region 72 are visible within the scene 70 shown on the display device 68. The AR computing device 66 in the example of FIG. 2A receives first user inputs (analogous to the first user inputs 30 of FIG. 1) defining the device region 72 when the user selects the boundary points 74(0) and 74(1) (e.g., by tapping the display device 68 or providing other input indicating selection of the boundary points 74(0) and 74(1)).

Similarly, FIG. 2B shows the AR computing device 66 displaying, via the display device 68, a scene 76 in which a different portion of the device region 72 is visible. As seen in FIG. 2B, a network device 78 is visible within the scene 76 shown on the display device 68. Accordingly, the AR computing device 66 in the example of FIG. 2B receives a second user input (analogous to the second user input 34 of FIG. 1) indicating the network device 78 within the device region 72 when the user selects the network device 78 by, as non-limiting examples, tapping the display device 68 or providing other input indicating a selection of the network device 78.

Finally, FIG. 2C illustrates the AR computing device 66 displaying a connected device list 80 (corresponding to the connected device list 38 of FIG. 1). The connected device list 80 includes a plurality of connected devices 82(0)-82(3), from which the user can select a connected device that corresponds to the network device 78 by tapping the display device 68 or providing other input indicating a selection of one of the connected devices 82(0)-82(3) as corresponding to the network device 78.

Figure 3A:
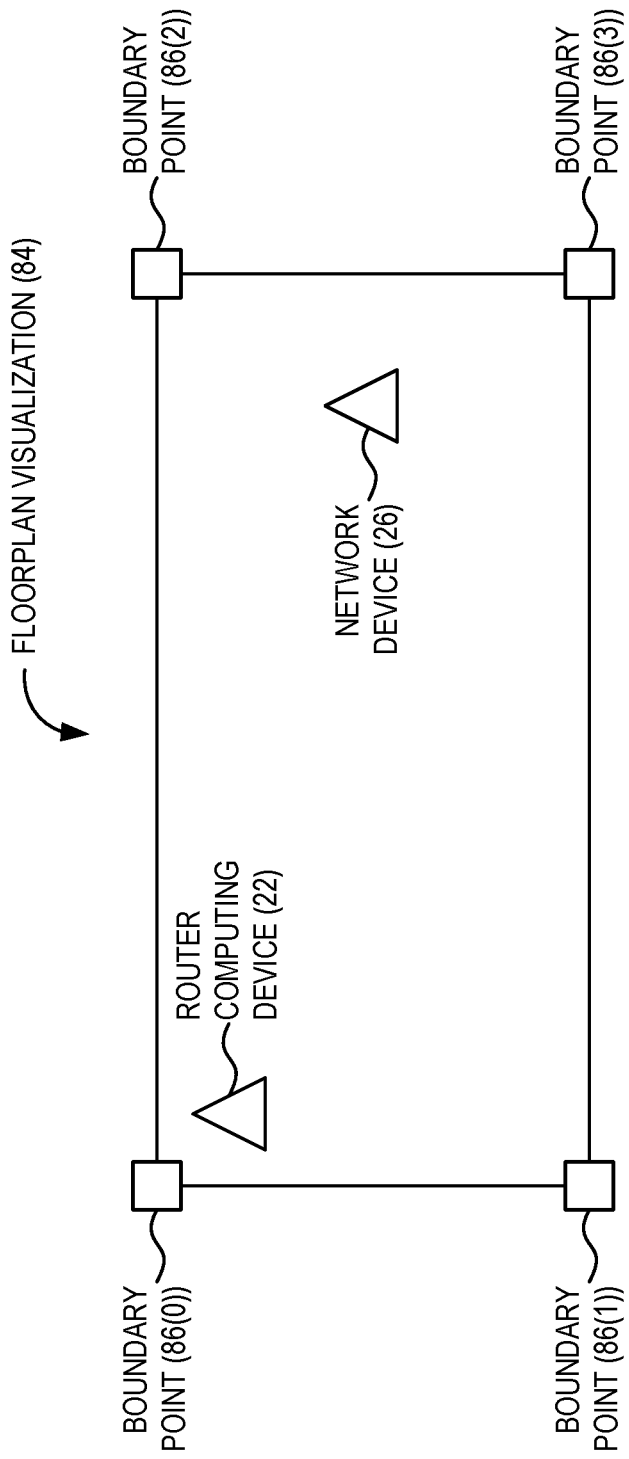
FIGS. 3A and 3B illustrate an exemplary floorplan visualization and a signal strength map, respectively, that may be generated using location metadata, in accordance with some embodiments.
Figure 3B:
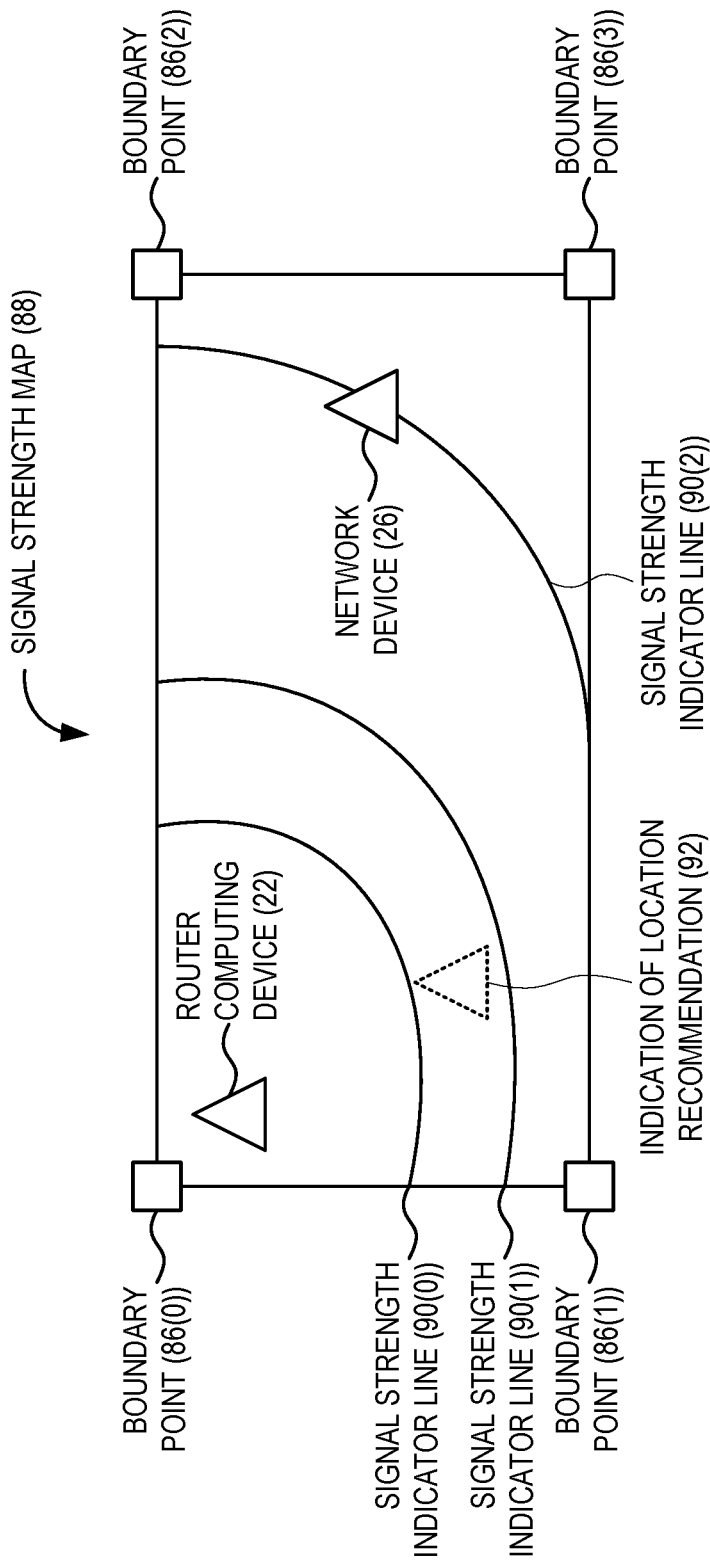

FIGS. 3A and 3B illustrate an exemplary floorplan visualization and an exemplary signal strength map, respectively, that may be generated by the server computing device 20 for the device region 28 of FIG. 1 using location metadata (i.e., the first metadata 44, the second metadata 46, the third metadata 52, the fourth metadata 58, and/or the fifth metadata 64 of FIG. 1) according to some embodiments. In FIG. 3A, a floorplan visualization 84 shows boundary points 86(0)-86(3) for the device region 28. The locations and relative positions of the boundary points 86(0)-86(3) are determined based on the plurality of first spatial coordinates 32 provided as part of the first metadata 44. Similarly, the floorplan visualization 84 also shows the location and relative position of the network device 26, based on the second spatial coordinates 36 provided as part of the second metadata 46. It is assumed for purposes of illustration that the second metadata 46 also includes the second spatial coordinates 36 for the router computing device 22, and thus the floorplan visualization 84 further shows the location and relative position of the router computing device 22.

FIG. 3B shows a signal strength map 88 that is similar to the floorplan visualization 84 of FIG. 3B, in that it illustrates the boundary points 86(0)-86(3) and the locations and relative positions of the network device 26 and the router computing device 22. However, the signal strength map 88 also includes signal strength indicator lines 90(0)-90(2) that are generated based on the fourth metadata 58 (and optionally the fifth metadata 64). The signal strength indicator lines 90(0)-90(2) in the example of FIG. 3B indicate zones in which the signal strength of transmissions received from the router computing device 22 falls within a specified range, with signal strength decreasing as distance from the router computing device 22 increases. In some embodiments, the signal strength map 88 may further include an indication 92 of a location recommendation that is generated by the server computing device 20 based on the signal strength map 88. The indication 92 indicates a location within the device region 28 to which the network device 26 may be relocated for better reception of transmissions from the router computing device 22.

FIGS. 4A-4D are message sequence diagrams illustrating messages sent and operations performed when obtaining location metadata for network devices using AR, in accordance with some embodiments. In FIGS. 4A-4D, elements of FIG. 1, including the user 24, the AR computing device 12, the router computing device 22, and the server computing device 20, are represented by vertical lines. Communications between the illustrated elements are represented by numbered arrows between the corresponding vertical lines, while operations performed by the illustrated elements are represented by numbered blocks. It is to be understood that, in some embodiments, the communications and operations illustrated herein may be performed in an order other than that shown in FIGS. 4A-4D, and/or may be omitted.

Figure 4A:
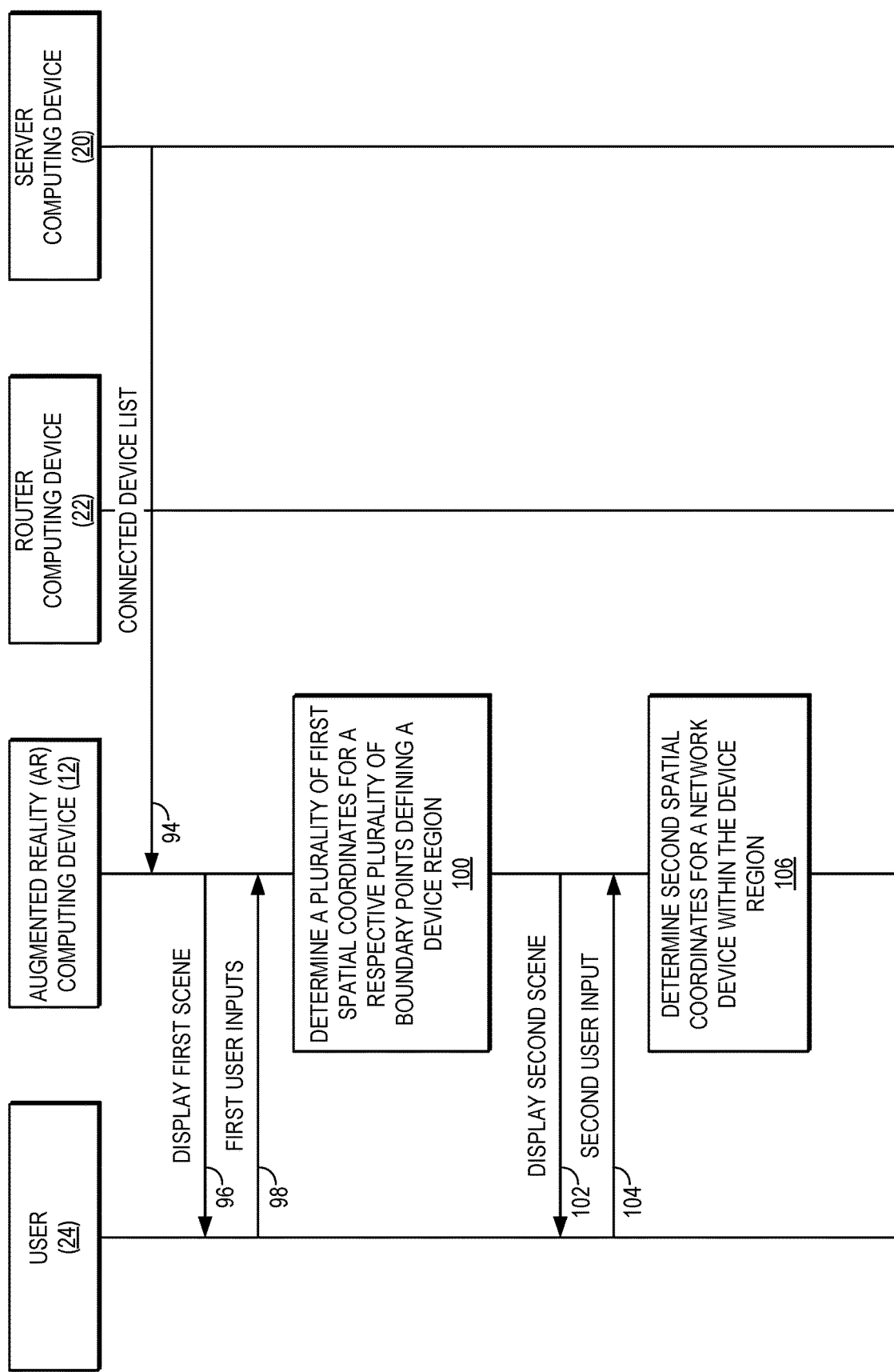
FIGS. 4A-4D are message sequence diagrams illustrating messages sent and operations performed when obtaining and utilizing location metadata for network devices, in accordance with some embodiments.

In FIG. 4A, operations begin with the AR computing device 12 receiving a connected device list, such as the connected device list 38, from the server computing device, as indicated by arrow 94. The AR computing device 12 then displays a first scene (such as the scene 70 of FIG. 2A) to the user 24, as indicated by arrow 96. The first scene may be displayed using, e.g., the display device 18 of FIG. 1. The AR computing device 12 subsequently receives, from the user 24, a plurality of first user inputs, such as the first user inputs 30 of FIG. 1, indicating a respective plurality of boundary points defining a device region (e.g., the boundary points 86(0)-86(3) of FIG. 3A, defining the device region 28 of FIG. 1), as indicated by arrow 98. The AR computing device then determines a plurality of first spatial coordinates (e.g., the plurality of first spatial coordinates 32 of FIG. 1) for the respective plurality of boundary points, as indicated by block 100.

The AR computing device 12 next displays a second scene (such as the scene 76 of FIG. 2B) to the user 24, as indicated by arrow 102. The AR computing device 12 receives, from the user 24, a second user input (such as the second user input 34 of FIG. 1) indicating a network device within the device region (e.g., the network device 26 within the device region 28 of FIG. 1), as indicated by arrow 104. The AR computing device then determines second spatial coordinates (e.g., the second spatial coordinates 36 of FIG. 1) for the network device, as indicated by block 106. Operations then continue in FIG. 4B.

Figure 4B:
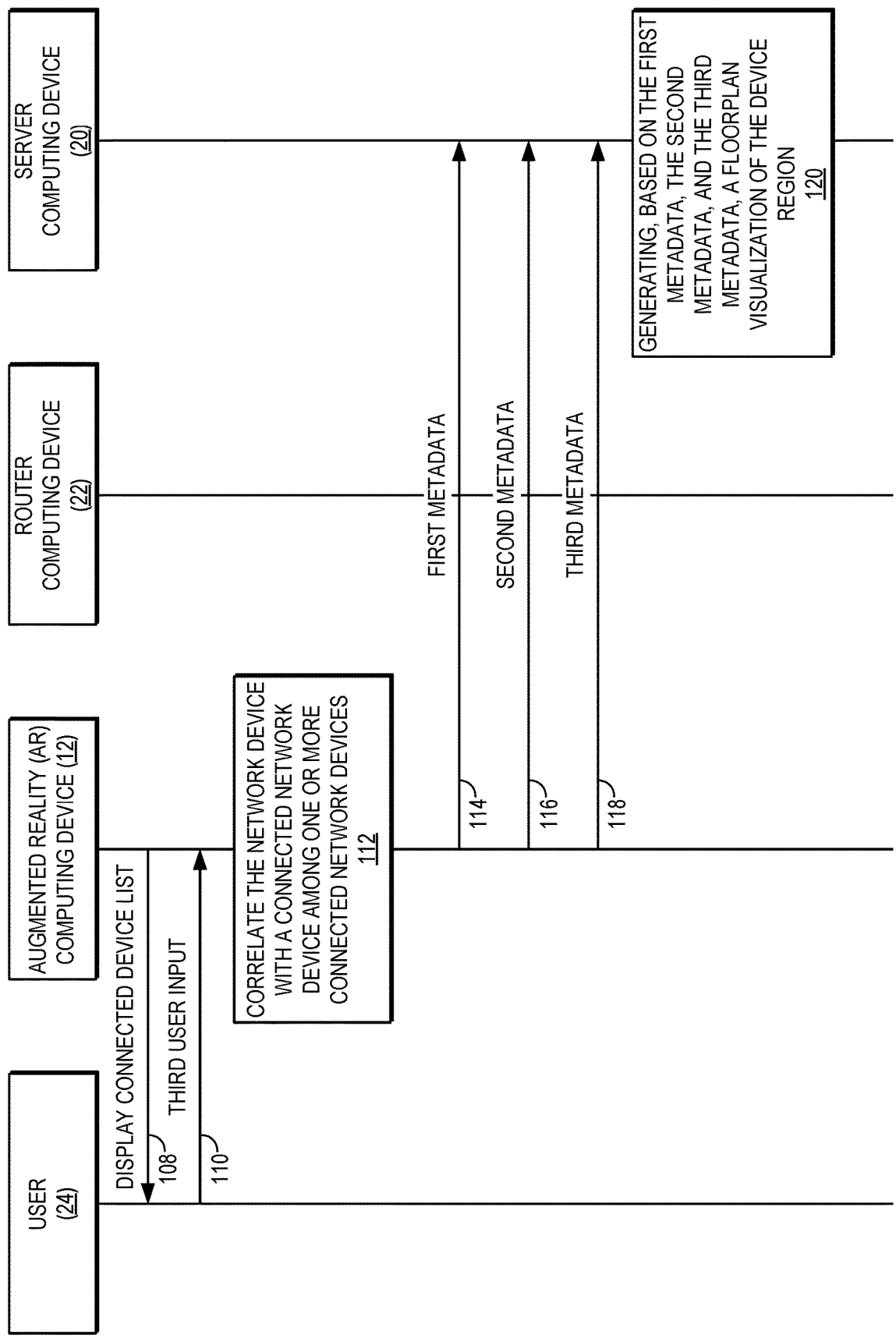
Figure 4C:
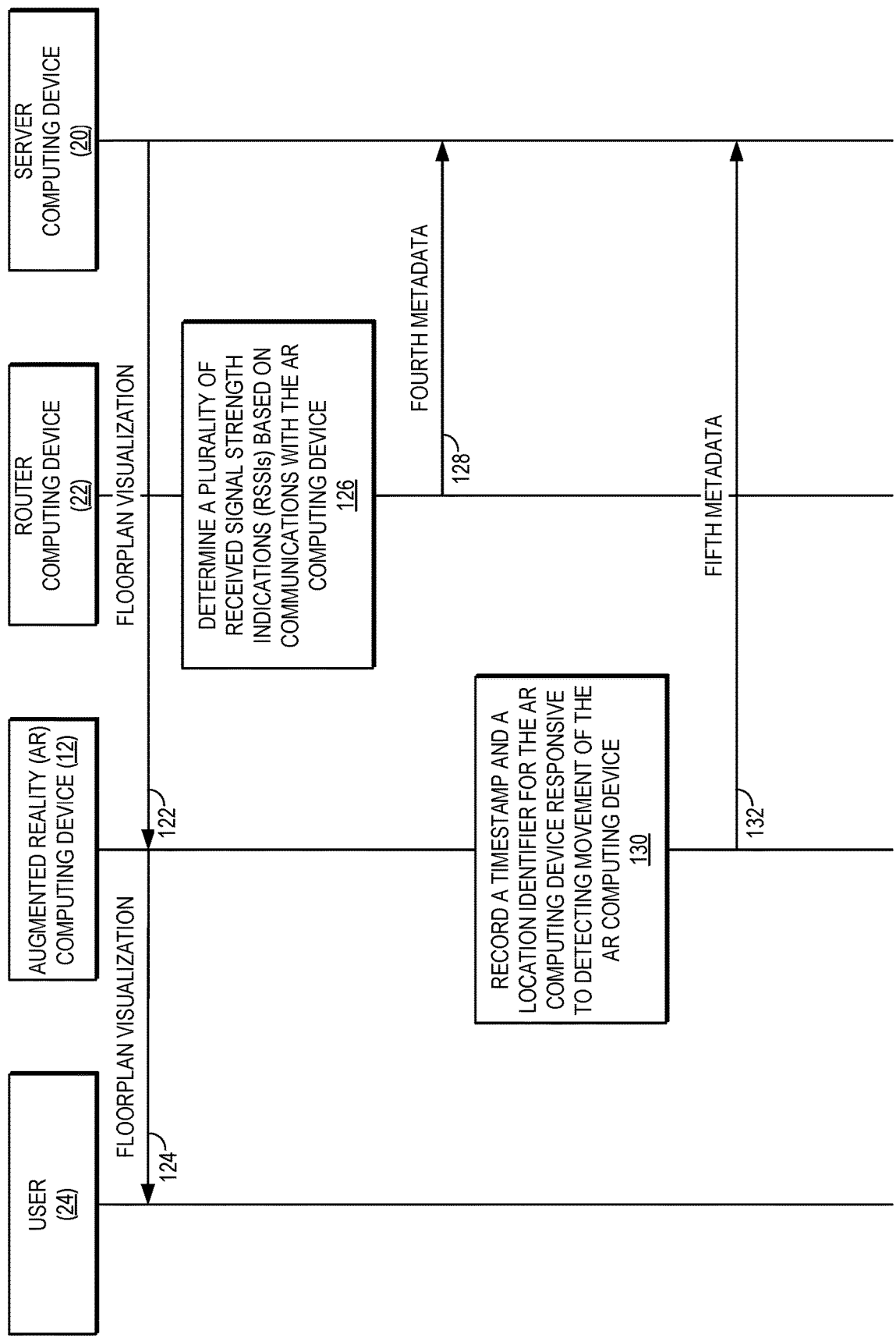

Referring now to FIG. 4B, the AR computing device 12 displays the connected device list to the user 24, as indicated by arrow 108. The AR computing device 12 then receives, from the user 24, a third user input (e.g., the third user input 42 of FIG. 1) indicating that the network device corresponds to a connected network device of the connected device list, as indicated by arrow 110. Based on the third user input, the AR computing device 12 correlates the network device with the connected network device among one or more connected network devices of the connected device list, as indicated by block 112. The AR computing device 12 then transmits first metadata, second metadata, and third metadata to the server computing device 20, as indicated by arrows 114, 116, and 118, respectively. The first metadata, the second metadata, and the third metadata may correspond to the first metadata 44, the second metadata 46, and the third metadata 52 of FIG. 1.

In one use case according to some embodiments, the server computing device 20 may generate a floorplan visualization of the device region (such as the floorplan visualization 84 of FIG. 3A) based on the first metadata, the second metadata, and the third metadata, as indicated by block 120. Operations then continue in FIG. 4C, where the floorplan visualization is then displayed to the user 24 via the AR computing device 12, as indicated by arrows 122 and 124.

In another use case according to some embodiments, the router computing device 22 may determine a plurality of RSSIs based on communications with the AR computing device 12 (e.g., the plurality of RSSIs 56(0)-56(R) of FIG. 1), as indicated by block 126. The router computing device 22 then transmits fourth metadata comprising the plurality of RSSIs (such as the fourth metadata 58 of FIG. 1) to the server computing device 20, as indicated by arrow 128. The AR computing device 12 may also record a timestamp and a location identifier for the AR computing device 12 responsive to detecting movement of the AR computing device, as indicated by block 130. The AR computing device 12 may then transmit fifth metadata comprising the timestamp and the location identifier (such as the fifth metadata 64 of FIG. 1) to the server computing device 20, as indicated by arrow 132. Operations then continue in FIG. 4D.

Figure 4D:
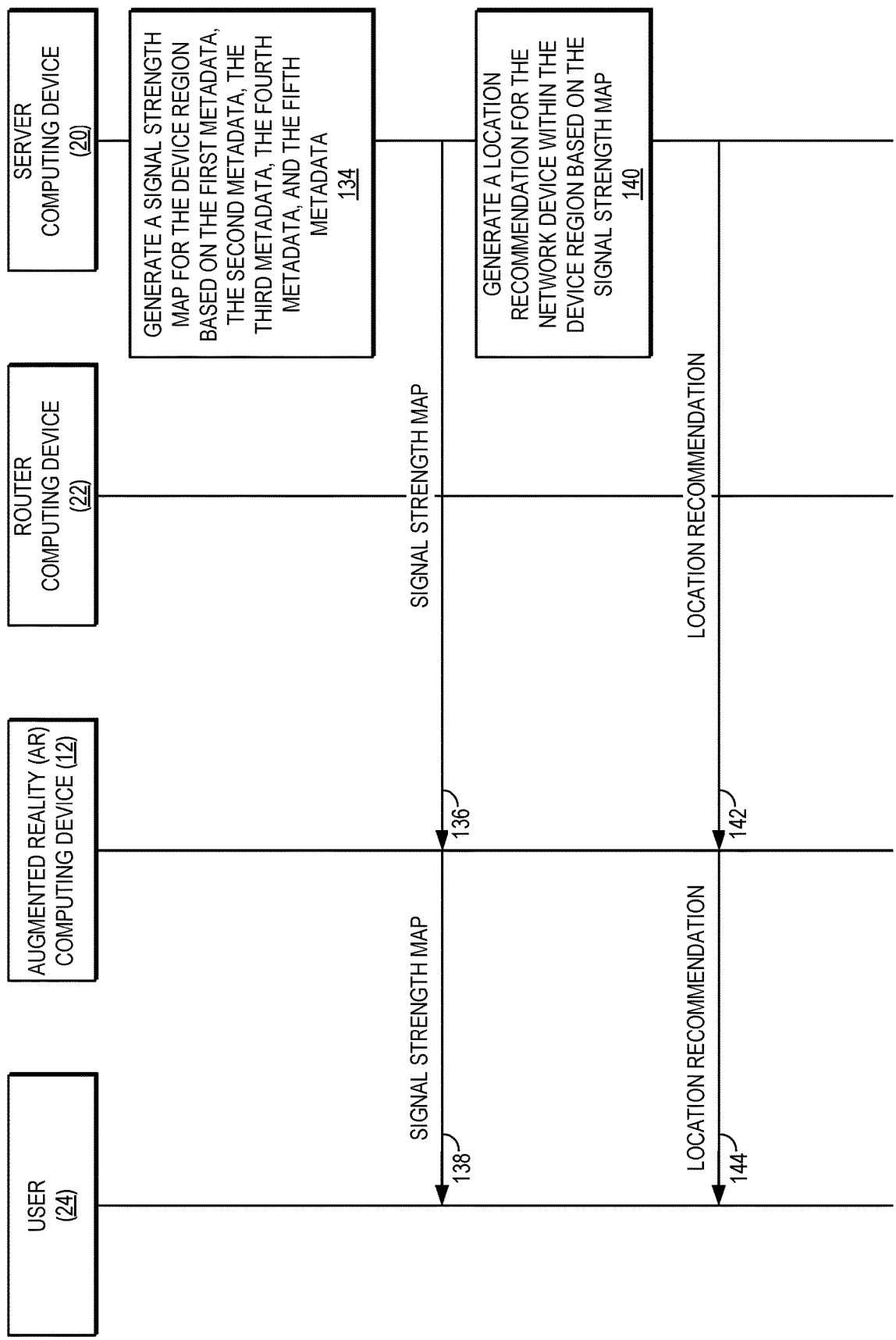

Turning now to FIG. 4D, the server computing device 20 in some embodiments may generate a signal strength map for the device region (such as the signal strength map 88 of FIG. 3B) based on the first metadata, the second metadata, the third metadata, the fourth metadata, and the fifth metadata, as indicated by block 134. The signal strength map is then displayed to the user 24 via the AR computing device 12, as indicated by arrows 136 and 138. Some embodiments may provide that the server computing device 20 also generates a location recommendation for the network device within the device region based on the signal strength map, as indicated by block 140. An indication of the location recommendation is then displayed to the user 24 via the AR computing device 12, as indicated by arrows 142 and 144.

Figure 5A:
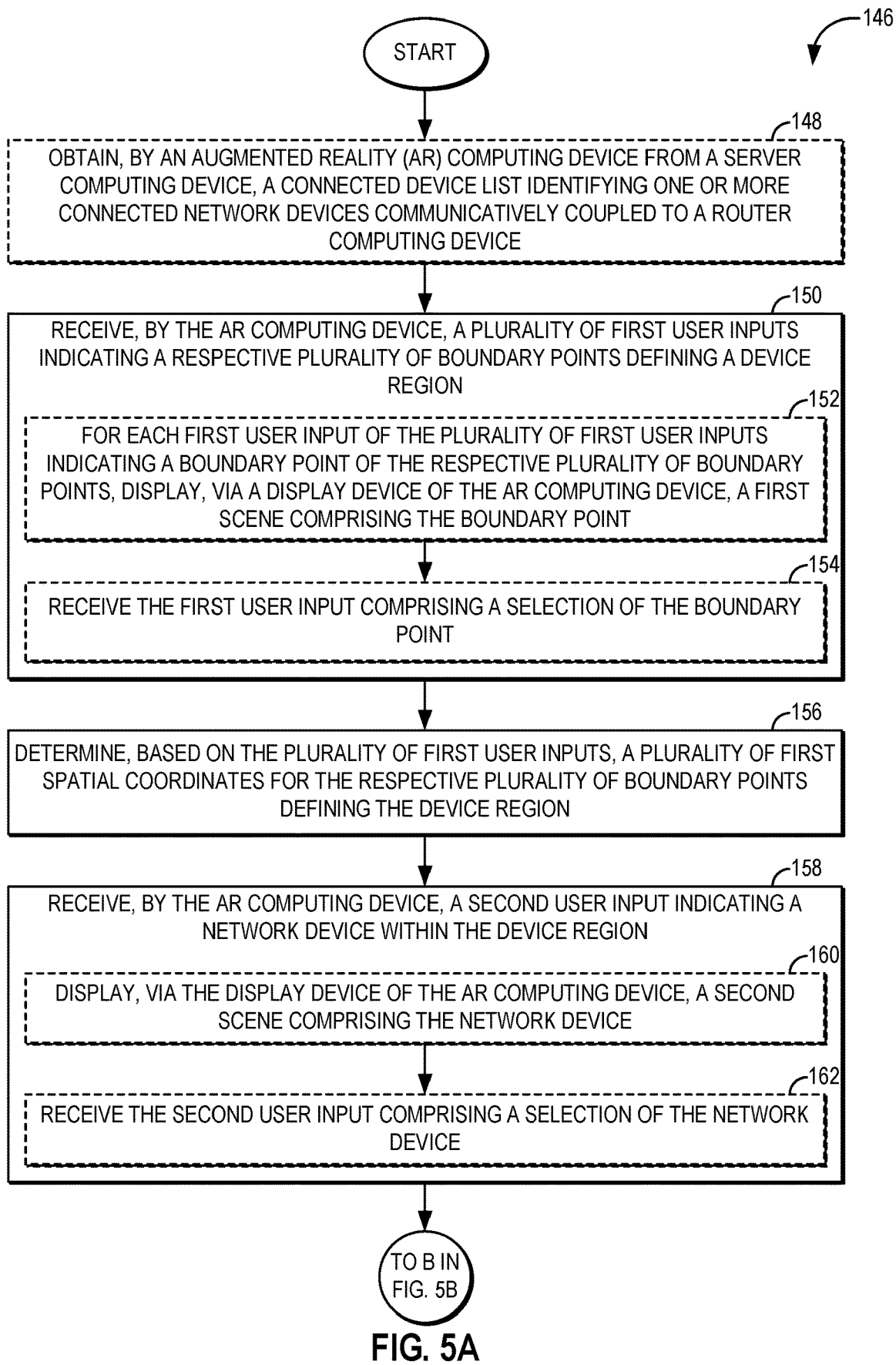
FIGS. 5A and 5B are flowcharts illustrating exemplary operations for obtaining location metadata for network devices using AR, in accordance with some embodiments.
Figure 5B:
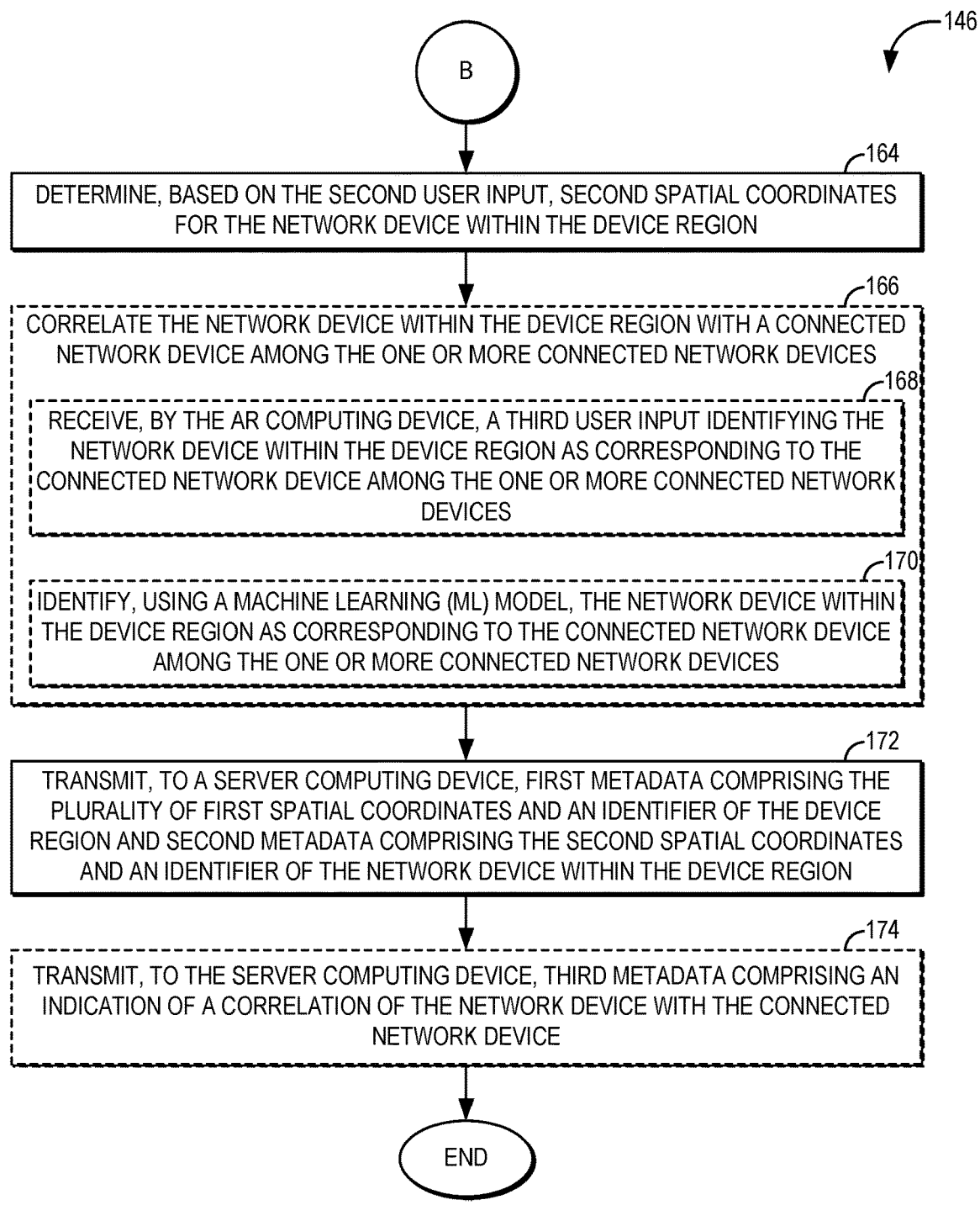

To illustrate exemplary operations for obtaining location metadata for network devices using AR, FIGS. 5A and 5B provide a flowchart 146. For the sake of clarity, elements of FIGS. 1, 2A, 2B, and 3A are referenced in describing FIGS. 5A and 5B. Operations in FIG. 5A in some embodiments begin with the AR computing device 12 of FIG. 1 obtaining, from the server computing device 20, the connected device list 38 identifying one or more connected network devices 40(0)-40(N) communicatively coupled to the router computing device 22 (block 148). The AR computing device 12 next receives the plurality of first user inputs 30 indicating a respective plurality of boundary points, such as the boundary points 86(0)-86(3) of FIG. 3A, defining the device region 28 (block 150). In some embodiments, operations of block 150 for receiving the plurality of first user inputs 30 may comprise, for each first user input of the plurality of first user inputs 30 indicating a boundary point of the respective plurality of boundary points 86(0)-86(3), displaying, via the display device 18, a first scene (e.g., the scene 70 of FIG. 2A) comprising the boundary point (block 152). The AR computing device 12 then receive the first user input comprising a selection of the boundary point (block 154). The AR computing device 12 next determines, based on the plurality of first user inputs 30, a plurality of first spatial coordinates 32 for the respective plurality of boundary points 86(0)-86(3) defining the device region 28 (block 156).

The AR computing device 12 also receives the second user input 34 indicating the network device 26 within the device region 28 (block 158). According to some embodiments, operations of block 158 for receiving the second user input 34 may comprise displaying, via the display device 18 of the AR computing device 12, a second scene (e.g., the scene 76 of FIG. 2B) comprising the network device 26 (block 160). The AR computing device 12 then receives the second user input 34 comprising a selection of the network device 26 (block 162). Operations then continue at block 164 of FIG. 5B.

Turning now to FIG. 5B, the AR computing device 12 determines, based on the second user input 34, second spatial coordinates 36 for the network device 26 within the device region 28 (block 164). In some embodiments, the AR computing device 12 may also correlate the network device 26 within the device region 28 with a connected network device among the one or more connected network devices 40(0)-40(N) (block 166). Some embodiments may provide that operations of block 166 for correlating the network device 26 with a connected network device among the one or more connected network devices 40(0)-40(N) comprise receiving, by the AR computing device 12, the third user input 42 identifying the network device 26 within the device region 28 as corresponding to the connected network device among the one or more connected network devices 40(0)-40(N) (block 168). According to some embodiments, operations of block 166 for correlating the network device 26 with a connected network device among the one or more connected network devices 40(0)-40(N) may comprise identifying, using a machine learning (ML) model, the network device 26 within the device region 28 as corresponding to the connected network device among the one or more connected network devices (0)-40(N) (block 170).

The AR computing device 12 next transmits, to the server computing device 20, the first metadata 44 comprising the plurality of first spatial coordinates 32 and the identifier of the device region 28, and the second metadata 46 comprising the second spatial coordinates 36 and the identifier of the network device 26 within the device region 28 (block 172). In some embodiments, the AR computing device 12 may also transmit, to the server computing device 20, the third metadata 52 comprising the indication 54 of the correlation of the network device 26 with the connected network device (block 174).

Figure 6:
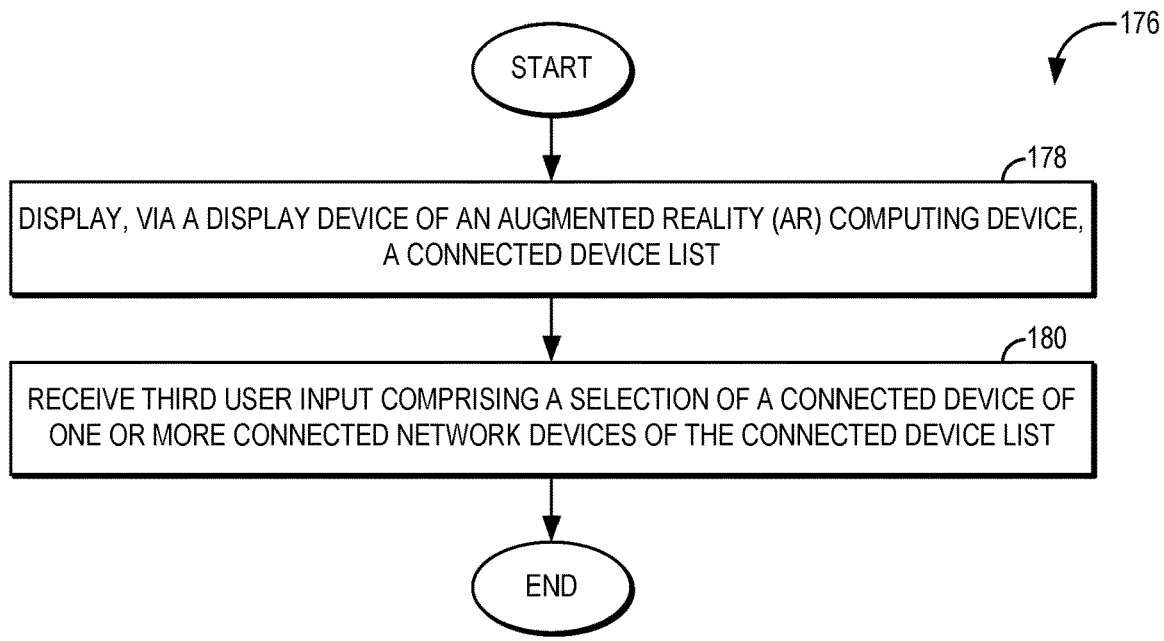
FIG. 6 is a flowchart illustrating exemplary operations for obtaining user input to correlate a network device with a known connected network device, in accordance with some embodiments.

FIG. 6 provides a flowchart 176 to illustrate exemplary operations for obtaining user input to correlate a network device, such as the network device 26 of FIG. 1, with a known connected network device, such as the one or more connected network devices 40(0)-40(N) of FIG. 1, in accordance with some embodiments. Elements of FIG. 1 are referenced in describing FIG. 6 for the sake of clarity. In FIG. 6, operations begin with the AR computing device 12 of FIG. 1 displaying, via the display device 18, the connected device list 38 (block 178). The AR computing device 12 then receives the third user input 42 comprising a selection of a connected device of one or more connected network devices 40(0)-40(N) of the connected device list 38 (block 180).

Figure 7:
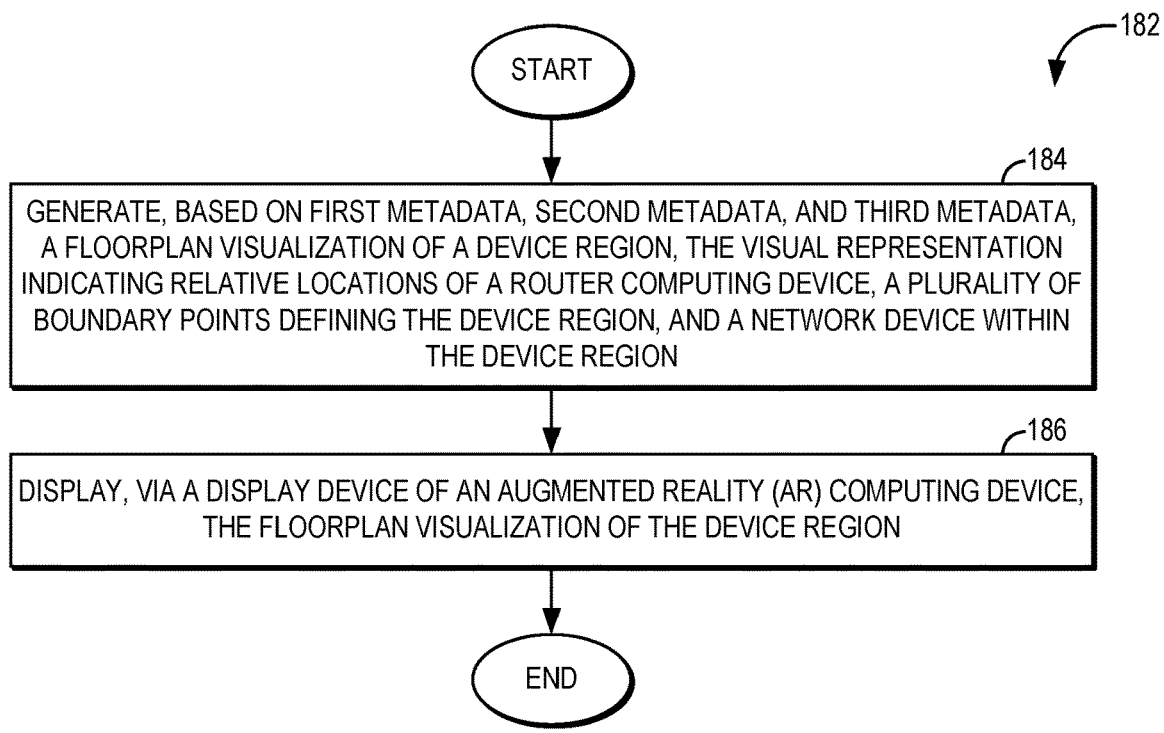
FIG. 7 is a flowchart illustrating exemplary operations for generating and displaying a floorplan visualization using obtained location metadata, in accordance with some embodiments.

To illustrate exemplary operations for generating and displaying a floorplan visualization, such as the floorplan visualization 84 of FIG. 3A, using obtained location metadata in accordance with some embodiments, FIG. 7 provides a flowchart 182. For the sake of clarity, elements of FIGS. 1 and 3A are referenced in describing FIG. 7. Operations in FIG. 7 begin with the server computing device 20 of FIG. 1 generating, based on the first metadata 44 and the second metadata 46, the floorplan visualization 84 of the device region 28, the floorplan visualization 84 indicating relative locations of the router computing device 22, the plurality of boundary points 86(0)-86(3) defining the device region 28, and the network device 26 within the device region 28 (block 184). The AR computing device 12 then displays, via the display device 18, the floorplan visualization 84 of the device region 28 (block 186).

Figure 8A:
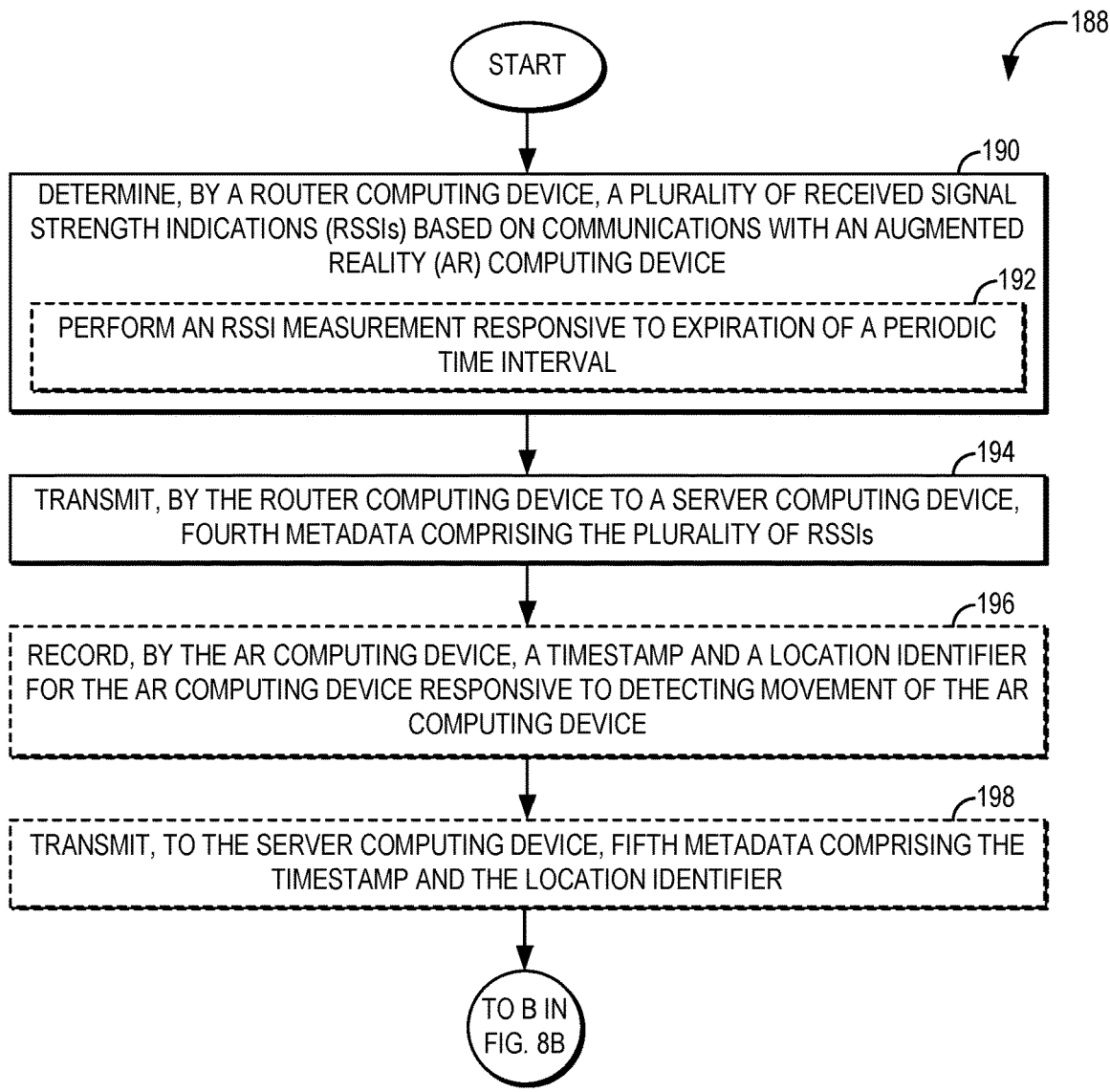
FIGS. 8A and 8B are flowcharts illustrating exemplary operations for generating and displaying a signal strength map using obtained location metadata, in accordance with some embodiments.
Figure 8B:
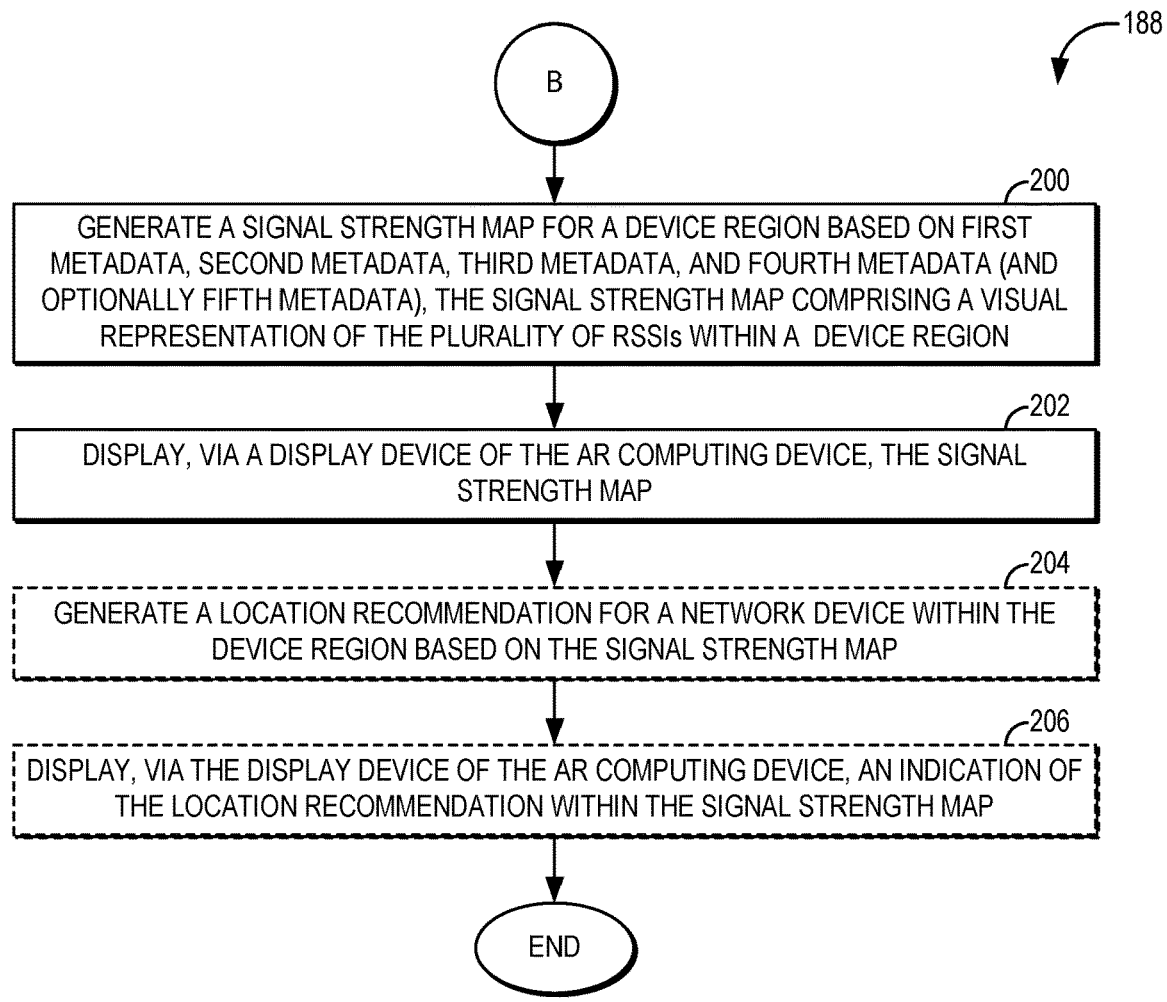

FIGS. 8A and 8B provide a flowchart 188 illustrating exemplary operations for generating and displaying a signal strength map, such as the signal strength map 88 of FIG. 3B, using obtained location metadata, in accordance with some embodiments. Elements of FIGS. 1 and 3B are referenced in describing FIGS. 8A and 8B for the sake of clarity. In FIG. 8A, operations begin with the router computing device 22 determining the plurality of RSSIs 56(0)-56(R) based on communications with the AR computing device 12 (block 190). In some embodiments, operations of block 190 for determining the plurality of RSSIs 56(0)-56(R) may comprise performing an RSSI measurement responsive to expiration of a periodic time interval (block 192). The router computing device 22 then transmits the fourth metadata 58 comprising the plurality of RSSIs 56(0)-56(R) to the server computing device 20 (block 194).

In some embodiments, the AR computing device 12 may also record the timestamp 60 and the location identifier 62 for the AR computing device 12 responsive to detecting movement of the AR computing device 12 (block 196). In such embodiments, the AR computing device 12 then transmits the fifth metadata 64 comprising the timestamp 60 and the location identifier 62 to the server computing device 20 (block 198). Operations then continue at block 200 of FIG. 8B.

Referring now to FIG. 8B, the server computing device 20 generates the signal strength map 88 for the device region 28 based on the first metadata 44, the second metadata 46, the third metadata 52, and the fourth metadata 58 (and optionally the fifth metadata 64), the signal strength map 88 comprising a visual representation of the plurality of RSSIs 56 within the device region 28 (block 200). The AR computing device 12 then displays, via the display device 18, the signal strength map 88 (block 202). Some embodiments may provide that the server computing device also generates the location recommendation for the network device 26 within the device region 28 based on the signal strength map 88 (block 204). In such embodiments, the AR computing device 12 then displays, via the display device 18, an indication 92 of the location recommendation within the signal strength map 88 (block 206).

Figure 9:
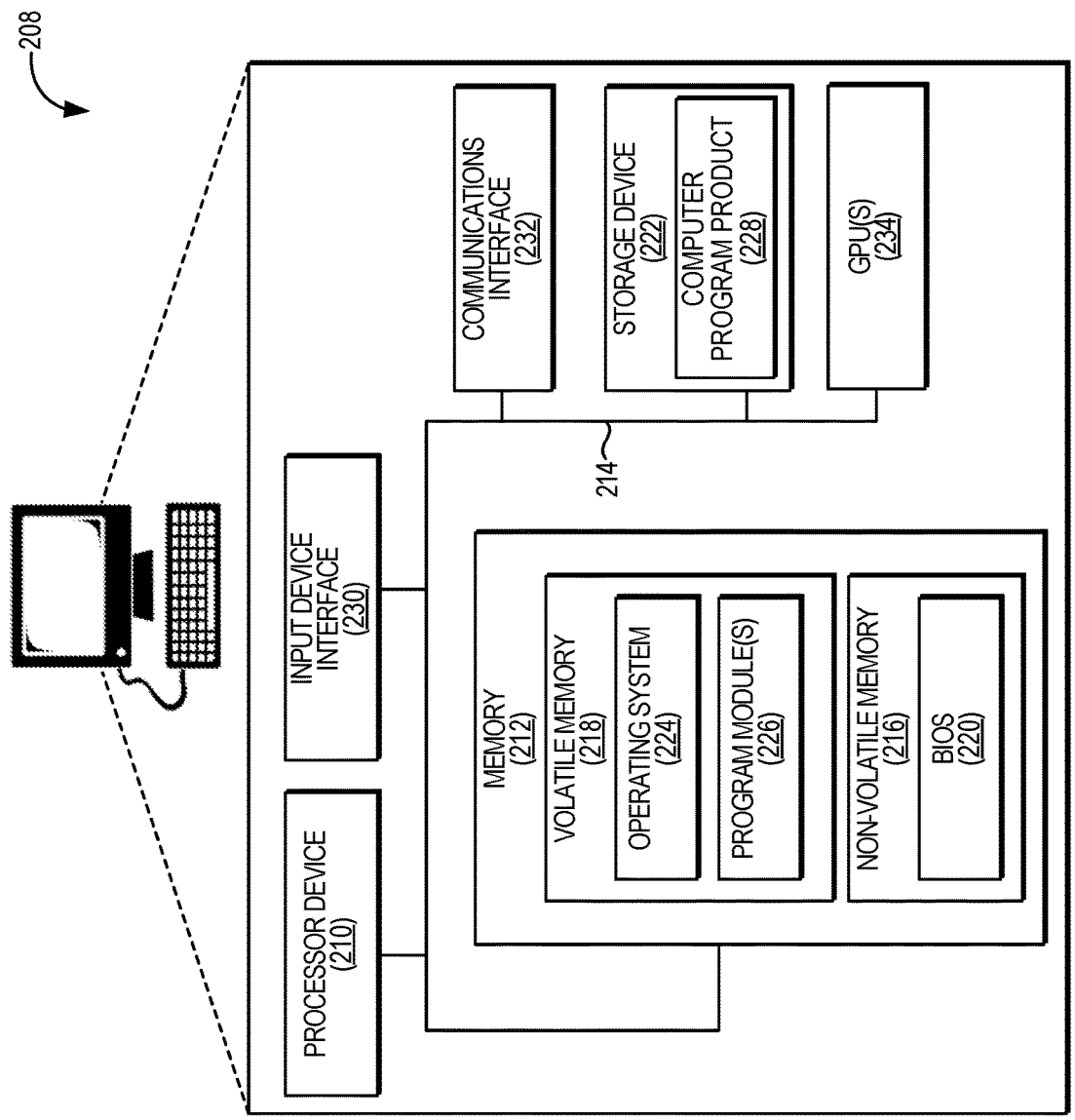
FIG. 9 is a block diagram of a computing device suitable for implementing embodiments disclosed herein.

FIG. 9 is a block diagram of a computing device 208, such as the AR computing device 12, the router computing device 22, and the server computing device 20 of FIG. 1, suitable for implementing examples according to one embodiment. The computing device 208 may comprise any computing or electronic device capable of including firmware, hardware, and/or executing software instructions to implement the functionality described herein, such as a computer server or the like. The computing device 208 includes a processor device 210, a memory 212, and a system bus 214. The system bus 214 provides an interface for system components including, but not limited to, the memory 212 and the processor device 210. The processor device 210 can be any commercially available or proprietary processor.

The system bus 214 may be any of several types of bus structures that may further interconnect to a memory bus (with or without a memory controller), a peripheral bus, and/or a local bus using any of a variety of commercially available bus architectures. The memory 212 may include non-volatile memory 216 (e.g., read-only memory (ROM), erasable programmable read-only memory (EPROM), electrically erasable programmable read-only memory (EEPROM), etc.), and volatile memory 218 (e.g., random-access memory (RAM)). A basic input/output system (BIOS) 220 may be stored in the non-volatile memory 216 and can include the basic routines that help to transfer information between elements within the computing device 208. The volatile memory 218 may also include a high-speed RAM, such as static RAM, for caching data.

The computing device 208 may further include or be coupled to a non-transitory computer-readable storage medium such as a storage device 222, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 222 and other drives associated with computer-readable media and computer-usable media may provide non-volatile storage of data, data structures, computer-executable instructions, and the like such as the VR content.

A number of modules can be stored in the storage device 222 and in the volatile memory 218, including an operating system 224 and one or more program modules 226, which may implement the functionality described herein in whole or in part. All or a portion of the examples disclosed herein may be implemented as a computer program product 228 stored on a transitory or non-transitory computer-usable or computer-readable storage medium, such as the storage device 222, which includes complex programming instructions, such as complex computer-readable program code, to cause the processor device 210 to carry out the steps described herein. Thus, the computer-readable program code can comprise software instructions for implementing the functionality of the examples described herein when executed by the processor device 210. The processor device 210 may serve as a controller, or control system, for the computing device 208 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 210 through an input device interface 230 coupled to the system bus 214 but can be connected through other interfaces such as a parallel port, an Institute of Electrical and Electronic Engineers (IEEE) 1394 serial port, a Universal Serial Bus (USB) port, an IR interface, and the like.

The computing device 208 may also include a communications interface 232 suitable for communicating with a network as appropriate or desired. The computing device 208 includes one or more graphic processing units (GPUs) 234.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
   sending, by a server computing device to an augmented reality (AR) computing device, a connected device list maintained by the server computing device, the connected device list identifying a plurality of connected network devices as being network devices that are communicatively coupled to a same router computing device;
   receiving, by the server computing device from the AR computing device, first metadata comprising a plurality of first spatial coordinates and an identifier of a device region, the first spatial coordinates comprising coordinates of a physical area within which a network device is located, second metadata comprising second spatial coordinates that identify a location of the network device within the physical area and an identifier of the network device, and third metadata comprising an indication that the network device corresponds to a connected network device in the connected device list;
   generating, by the server computing device, a floorplan visualization of the device region based on the first metadata, the second metadata, and the third metadata; and
   sending, by the server computing device to the AR computing device, the floorplan visualization of the device region.

2. The method of claim 1, wherein the floorplan visualization indicates relative locations of the router computing device and the network device within the physical area.

3. The method of claim 1, further comprising:
   receiving, by the server computing device from the router computing device, fourth metadata comprising a plurality of received signal strength indications (RSSIs) based on communications between the router computing device and the AR computing device; and
   generating, by the server computing device, a signal strength map for the device region based on the first metadata, the second metadata, the third metadata, and the fourth metadata, the signal strength map comprising a visual representation of the plurality of RSSIs within the device region.

4. The method of claim 3, wherein generating the floorplan visualization is further based on the fourth metadata.

5. The method of claim 3, further comprising:
   generating, by the server computing device, a location recommendation for the network device within the device region based on the signal strength map.

6. The method of claim 3, further comprising:
   receiving, by the server computing device from the AR computing device, fifth metadata comprising a timestamp and a location identifier for the AR computing device responsive to detecting movement of the AR computing device; and
   wherein generating the signal strength map is further based on the fifth metadata.

7. The method of claim 6, wherein generating the floorplan visualization is further based on the fourth metadata and the fifth metadata.

8. A server computing device, comprising:
   a system memory; and
   a processor device communicatively coupled to the system memory and configured to:
      send, to an augmented reality (AR) computing device, a connected device list maintained by the server computing device, the connected device list identifying a plurality of connected network devices as being network devices that are communicatively coupled to a same router computing device;
      receive, from the AR computing device, first metadata comprising a plurality of first spatial coordinates and an identifier of a device region, the first spatial coordinates comprising coordinates of a physical area within which a network device is located, second metadata comprising second spatial coordinates that identify a location of the network device within the physical area and an identifier of the network device, and third metadata comprising an indication that the network device corresponds to a connected network device in the connected device list;
generate a floorplan visualization of the device region based on the first metadata, the second metadata, and the third metadata; and
send, to the AR computing device, the floorplan visualization of the device region.

9. The server computing device of claim 8, wherein the floorplan visualization indicates relative locations of the router computing device and the network device within the physical area.

10. The server computing device of claim 8, wherein the processor device is further to:
receive, from the router computing device, fourth metadata comprising a plurality of received signal strength indications (RSSIs) based on communications between the router computing device and the AR computing device; and
generate a signal strength map for the device region based on the first metadata, the second metadata, the third metadata, and the fourth metadata, the signal strength map comprising a visual representation of the plurality of RSSIs within the device region.

11. The server computing device of claim 10, wherein to generate the floorplan visualization is further based on the fourth metadata.

12. The server computing device of claim 10, wherein the processor device is further to:
generate a location recommendation for the network device within the device region based on the signal strength map.

13. The server computing device of claim 10, wherein the processor device is further to:
receive, from the AR computing device, fifth metadata comprising a timestamp and a location identifier for the AR computing device responsive to detecting movement of the AR computing device; and
wherein to generate the signal strength map is further based on the fifth metadata.

14. The server computing device of claim 13, wherein to generate the floorplan visualization is further based on the fourth metadata and the fifth metadata.

15. A non-transitory computer-readable medium having stored thereon computer-executable instructions that, when executed, cause a processor device of a server computing device to:
send, to an augmented reality (AR) computing device, a connected device list maintained by the server computing device, the connected device list identifying a plurality of connected network devices as being network devices that are communicatively coupled to a same router computing device;
receive, from the AR computing device, first metadata comprising a plurality of first spatial coordinates and an identifier of a device region, the first spatial coordinates comprising coordinates of a physical area within which a network device is located, second metadata comprising second spatial coordinates that identify a location of the network device within the physical area and an identifier of the network device, and third metadata comprising an indication that the network device corresponds to a connected network device in the connected device list;
generate a floorplan visualization of the device region based on the first metadata, the second metadata, and the third metadata; and
send, to the AR computing device, the floorplan visualization of the device region.

16. The non-transitory computer-readable storage medium of claim 15, wherein the floorplan visualization indicates relative locations of the router computing device and the network device within the physical area.

17. The non-transitory computer-readable storage medium of claim 15, wherein the instructions are further to:
receive, from the router computing device, fourth metadata comprising a plurality of received signal strength indications (RSSIs) based on communications between the router computing device and the AR computing device; and
generate a signal strength map for the device region based on the first metadata, the second metadata, the third metadata, and the fourth metadata, the signal strength map comprising a visual representation of the plurality of RSSIs within the device region.

18. The non-transitory computer-readable storage medium of claim 17, wherein to generate the floorplan visualization is further based on the fourth metadata.

19. The non-transitory computer-readable storage medium of claim 17, wherein the instructions are further to:
generate a location recommendation for the network device within the device region based on the signal strength map.

20. The non-transitory computer-readable storage medium of claim 17, wherein the instructions are further to:
receive, from the AR computing device, fifth metadata comprising a timestamp and a location identifier for the AR computing device responsive to detecting movement of the AR computing device; and
wherein to generate the signal strength map is further based on the fifth metadata.

* * * * *